Feb. 16, 1937.   H. C. WRIGHT   2,070,768
MIXER
Filed Aug. 6, 1936
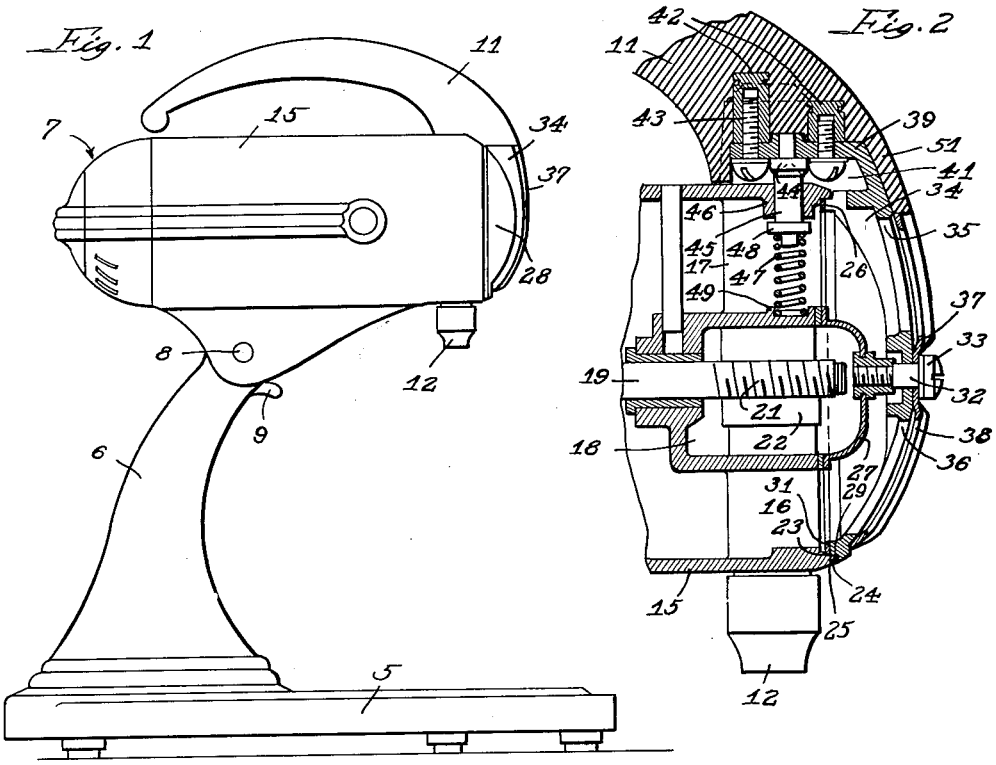
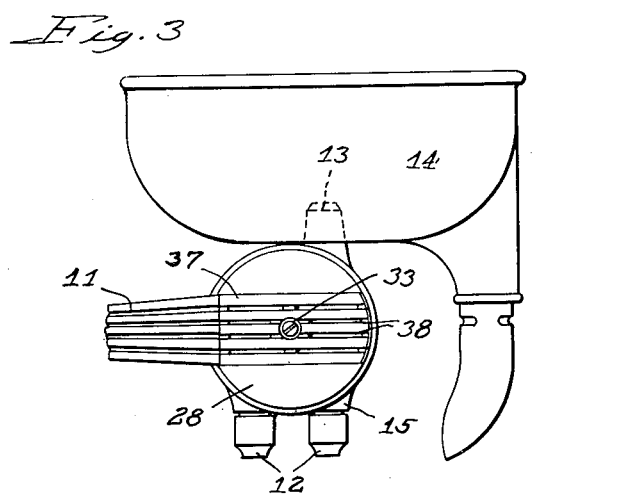
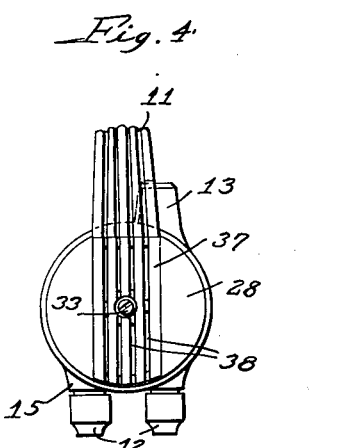
Inventor:
Horace C. Wright
By
Wilson, Dowell, McCanna & Wintercorn
Attys.

Patented Feb. 16, 1937

2,070,768

UNITED STATES PATENT OFFICE 2,070,768

MIXER

Horace C. Wright, Chicago, Ill., assignor to Chicago Flexible Shaft Company, Chicago, Ill., a corporation of Illinois Application August 6, 1936, Serial No. 94,560

12 Claims. (Cl. 146—3)

This invention relates to household mixers and the like and has special reference to a motor unit having improved handle construction.

Among the objects of the invention is the provision of a generally improved motor unit and handle construction to provide a more efficient, cheaper and more harmonious appearing structure; to provide improved means for carrying the handle on the motor unit giving rigidity and smooth operation; to provide a handle construction having a single point of support on the motor unit, and to provide a handle construction wherein the handle moves in an arc around the longitudinal center line of the mixer unit.

Other objects and advantages will be apparent from the following description and the accompanying drawing, in which—

Figure 1 is a side view of a mixer embodying my invention;

Fig. 2 is a fragmentary section through the front end of the motor unit and handle construction;

Fig. 3 is a front view of the mixer unit showing the handle in the inoperative position and a juicer bowl positioned on the top of the mixer unit, and Fig. 4 is a front view of the mixer unit showing the handle in the operative position.

The invention is herein shown as embodied in a mixer having a base 5, a pedestal 6 upon which the mixer unit, designated generally by 7, is supported for rotation about a pin 8 and is adapted to be released from the pedestal by actuation of a trigger 9 so that the mixer unit 7 may be used in a portable manner and handled independently of the base 5 and column 6 by means of a handle 11. The mixer unit 7 has a pair of spindles 12 adapted for the reception of beater blades or similar attachments. Likewise, the mixer unit has an upstanding boss 13 adapted for the reception of attachments such as a juicer bowl 14 when the unit occupies its fixed position on the pedestal 6.

Referring now more particularly to Fig. 2, the mixer unit has a motor casing designated generally by the numeral 15 adjacent one end of which are a pair of laterally spaced lower spindle bearings 16 and laterally spaced upper spindle bearings 17 which intersect a gear chamber 18. The armature shaft 19 of a motor, not shown, projects into the chamber 18 and has a worm 21 for driving laterally spaced worm gears 22 carried on the spindles 12.

The open front end of the motor casing 15 is provided with annular shoulders 23 and 24 in planes at right angles to the axis of the casing and with a bearing surface 25 lying circumferentially of the casing. A closure member has a rim 26 which rests against the shoulder 23 and the bearing surface 25, and a centrally disposed portion 27 attached thereto which acts as a closure for the gear chamber 18.

An arcuately shaped handle plate 28 is positioned across the end of the motor casing 15 and is provided with an annular surface 29 bearing against the surface 25 of the casing, and a shoulder 31 bearing against the rim 26 whereby to guide and retain the plate upon rotation. A screw 32 passes through the plate 28 on the longitudinal center line of the casing 15 and is threaded into the portion 27, a head 33 on the screw retaining the plate 28 in position and the plate rotating on the screw 32. The plate is provided with a relatively wide transverse panel 34 standing thereacross substantially at the center, in the front wall of which are provided openings 35 and 36 for the passage of air to the interior of the casing 15. The screw 32 likewise serves to hold in position across the openings 35 and 36 a grill designated generally by the numeral 37 in this instance being of ornamental sheet metal and having parallel slots 38 for the passage of air to the interior of the casing. The forward wall of the panel 34 extends upward and backward along the casing 15, as shown at 39, for the attachment of the handle 11.

The handle 11 is recessed, as shown at 41, for the reception of the plate portion 39 and has inserts 42 adapted to receive screws 43 for attachment of the handle to the portion 39. The handle is in this instance formed of plastic material such as the synthetic resins, one example of which is "bakelite". The portion 39 has a button 44 having a recessed head for the purpose of receiving a latch pin 45 seated in a boss 46 on the upper side of the casing 15 and slidable therein, the pin 45 being urged to an upward position by a spring 47 bearing against a shoulder 48 on the pin and seating in a boss 49 on the top wall of the gear chamber 18. The shoulder 48 also serves as a stop to limit the outward movement of the pin 45. The forward edge of the handle 11 extends forwardly and downwardly, as shown at 51, to meet the grill 37 adjacent the upper edge of the opening 35.

It will be seen from the preceding description that the handle 11 is adapted to occupy the position shown in Fig. 3 so as to permit of the positioning of a juicer bowl 14 or other attachment on the top of the mixer unit when the mixer unit is used on the pedestal 6 and to be rotated to the position shown in Figs. 1, 2, and 4 for portable use of the mixer unit. Attention is directed to the fact that through this handle arrangement it is possible to mount the juicer bowl at a relatively low position so that its bottom rests directly against the casing 15. Another advantage of this construction is the avoidance of unsightly attaching means for the ends of the handle which heretofore have been cut into the symmetrical sides of the casing.

A still further advantage of this construction is the fact that a very large and rigid bearing surface is obtained as between the handle and the casing occasioned by the use of the plate 28 which seats in the annulus of the casing. Attention is also directed to the fact that when the handle 11 moves from between its position the distance between the center portion of the handle and the casing remains unchanged. In other words, the handle remains a fixed distance from the longitudinal axis of the casing which makes for convenience in operation of the device. It should also be noted that because of the wide bearing area of the plate 28 the handle need only be attached at one end, thereby saving the expense of additional connection as well as the unsightliness of such an arrangement.

While I have described and illustrated a specific embodiment of the invention, I do not wish to be limited except as required by the prior art and the scope of the appended claims, in which—

I claim:

1. The combination in a household mixer, of a mixer unit, a handle extending longitudinally of said unit, and means to support the handle thereon for rotation with respect to said unit on an axis substantially coincident with the longitudinal center line of said unit.

2. The combination in a mixer, of a mixer unit having a casing, a plate seated on the end of the casing for rotation about its center, means on the casing arranged annularly of the plate to retain the latter against lateral displacement, a handle on said plate extending longitudinally of said casing, and latching means for retaining the handle and plate in a defined rotative position.

3. The combination in a household mixer, of a mixer unit comprising a motor having a casing, a handle for said casing movable between an operative position and an inoperative position, means for supporting the handle on the casing comprising a plate positioned against one end of the casing, and means for rotatively supporting the plate thereon.

4. The combination in a mixer, of a mixer unit comprising a motor, a motor casing having a cylindrical body portion, a handle plate seated on one of the casing and projecting over said body portion, means supporting said plate for rotation on an axis in the region of the longitudinal center line of said body portion, and a handle attached to said projecting portion to move annularly of said casing upon rotation of said plate.

5. The combination in a mixer, of a mixer unit comprising a motor, a motor casing having a cylindrical body portion, a handle plate seated on one end of the casing and projecting over said body portion, means supporting said plate for rotation on an axis in the region of the longitudinal center line of said body portion, a handle attached to said projecting portion to move annularly of said casing upon rotation of said plate, and latch means to selectively retain said handle in a defined position.

6. The combination in a mixer, of a mixer unit including a motor casing having annular retaining means, a plate seated in said retaining means for rotation therein, said plate having a portion extending along the side of said casing, a handle attached at one end to said portion and extending longitudinally of said casing for rotation annularly thereof, and latch means acting between the annular wall of said casing and said portion to selectively latch the handle and plate in a defined location.

7. The combination in a household mixer, of a mixer unit having a casing of generally cylindrical configuration, a handle for said casing extending longitudinally thereof, and means for supporting said handle on the casing for movement annularly along the wall of the casing at substantially a fixed distance therefrom.

8. The combination in a mixer, of a mixer unit comprising a motor, a motor casing having an open end for the passage of air, a handle plate seated for rotation across said open end, said plate having an opening for the passage of air, a handle carried by the plate extending longitudinally of said casing, and a grill seated over said opening to prevent said opening from being covered and the passage of air thereby terminated.

9. The combination in a mixer, of a mixer unit comprising a motor casing having a gear chamber adjacent one end thereof, a perforate end plate closing said gear chamber but allowing the entry of air to said casing, a perforate handle plate seated for rotation on the end of said casing and having the perforated portion spaced from said end plate to afford passage of air through said plates at any angular position of the handle plate, and a handle positioned on said handle plate for movement along the wall of said casing.

10. A household mixer and juice extractor having, in combination, a mixer unit, means supporting the mixer unit in a working position and permitting removal of said unit for use remote from and independent of said working position, a juicer bowl removably mounted on said mixer unit, a handle extending longitudinally of said unit, and means to support the handle thereon for rotation on an axis substantially coincident with the longitudinal center line of said unit between a position above the mixer unit when the juicer bowl is removed for use of the unit independent of said working position, and a rotative position along the side of said unit for the use of said juicer bowl.

11. A household mixer and juice extractor having, in combination, a base, a mixer unit supported in a stationary position on the base and removable therefrom for independent use, said unit having a casing, a juicer bowl removably supported on top of the mixer unit, a handle plate seated on one end of the casing and rotatable substantially about the longitudinal center line of the casing, a handle carried on said handle plate for rotation therewith between a position above said casing and a position to one side of said casing, and means acting on the plate for selectively retaining the handle and plate in the first mentioned position.

12. A household mixer and juice extractor having, in combination, a base, a mixer unit supported in a stationary position on said base and removable therefrom for independent use, said unit having a motor casing, a juicer bowl removably supported on top of the mixer unit, a plate rotatably positioned against one end of said casing for rotation about substantially the center line thereof, said plate having a portion extending along the side of the casing, retaining means on said casing for retaining said plate along its annulus, a handle attached at one end to said portion and extending longitudinally of the casing for rotation annularly thereof, and latch means acting between the annular wall of said casing and said portion to selectively latch the handle in a position above said casing and permit the rotation thereof to a position at one side of said casing.

HORACE C. WRIGHT.